United States Patent [19]
Liu et al.

[11] Patent Number: 5,982,809
[45] Date of Patent: Nov. 9, 1999

[54] METHOD AND APPARATUS FOR CARRIER RECOVERY AND COMPENSATION IN SPREAD SPECTRUM COMMUNICATIONS

[75] Inventors: Hui Liu; Guanghan Xu; Ping Liu, all of Austin, Tex.

[73] Assignee: Cwill Telecommunications, Inc., Austin, Tex.

[21] Appl. No.: 08/787,610

[22] Filed: Jan. 23, 1997

[51] Int. Cl.⁶ .................................................. H04K 1/00
[52] U.S. Cl. ........................................... 375/206; 375/326
[58] Field of Search ................................ 375/200, 206, 375/326, 208; 329/306, 307

[56] References Cited

U.S. PATENT DOCUMENTS 5,787,112   7/1998   Murai ...................................... 375/206

OTHER PUBLICATIONS

Proakis, J., *Digital Communications*, Third Edition, McGraw–Hill, Inc., pp. 337–342.

*Primary Examiner*—Tesfaldet Bocure
*Attorney, Agent, or Firm*—Conley, Rose & Tayon; Jeffrey C. Hood

[57] ABSTRACT

An improved system and method for determining and tracking the carrier offset in a communications system. In an exemplary implementation, sampled spread spectrum digital signals are compensated with an expected carrier offset and stripped of pseudo-noise codes to produce demodulated signals. The demodulated signals are applied to a carrier offset estimator. The carrier offset estimator divides pairs of demodulated signals with a predetermined interval to produce results containing phase change information. The results are then averaged, and the average is normalized with respect to the predetermined interval to yield a new estimate of the carrier offset. The expected carrier frequency is adjusted based on the new offset estimate for frequency compensation in subsequent reception and transmission operations.

11 Claims, 4 Drawing Sheets

METHOD AND APPARATUS FOR CARRIER RECOVERY AND COMPENSATION IN SPREAD SPECTRUM COMMUNICATIONS

BACKGROUND OF THE INVENTION

This invention relates in general to the field of communication systems, and more particularly to carrier recovery and compensation in communication systems which modulate information with an analog carrier frequency.

DESCRIPTION OF THE RELATED ART

In a direct sequence spread spectrum communication system, each message symbol is spread into a plurality of chips using a pseudo-random (PN) sequence known to both the transmitter and the receiver. The plurality of chips are then modulated onto an analog carrier signal, such as an RF (radio frequency) signal, for transmission. The receiver down-converts the received signals to remove the analog carrier frequency. Ideally, a receiver can perform despreading to remove the PN sequence from the downconverted received signals with the replica of the PN sequence and recover the transmitted message symbols. In practice, however, even after the analog carrier frequency has been removed, the down-converted received signals, referred to as baseband signals, inevitably still include a carrier frequency. As used herein, the term "analog carrier frequency" is used to refer to the carrier frequency, such as an RF carrier frequency, used by an up-converter to modulate data for transmission over a medium. The term "baseband carrier frequency" or simply "carrier frequency" is used to refer to the carrier frequency remaining in the baseband signal after down-conversion has been performed. The carrier frequency comprised in the baseband signal is a result of the frequency difference in the oscillators in the receiver and transmitter. The carrier frequency comprised in the baseband signal is time-varying, and can generally be considered as varying about a fixed point, referred to as the expected carrier frequency. The carrier frequency in the received baseband signal can thus be considered as comprising an expected carrier frequency plus an unknown carrier offset.

Since the down-converted received signals, or baseband signals, include a carrier frequency, this necessitates the use of carrier recovery before regular demodulation of spread spectrum signals can be performed. Conventional carrier recovery methods using analog phase lock loop (PLL) circuits are susceptible to carrier jitter and have fundamental difficulties in tracking large carrier variations. A digital carrier frequency correction approach is disclosed by Stein et al., in "Carrier Frequency Correction for a DSSS Communication System", U.S. Pat. No. 5,303,257, April/1994. The method provides robust carrier offset estimation by computing the energy of received signal in a plurality of frequency bins. One drawback however, is that the resolution of the carrier estimate is limited by the number of frequency bins involved. Hence, in general the carrier compensation is sub-optimal even without the presence of noise or interference.

Therefore, a system and method is desired to accomplish precise carrier offset estimation with fixed low computations without sacrificing the robustness of spread spectrum communications.

SUMMARY OF THE INVENTION

The present invention comprises a system and method for performing more precise carrier offset estimation with reduced computations. In a preferred spread spectrum embodiment of the invention, during a training period pilot signals modulated by the respective user's PN sequence are transmitted to provide a carrier reference for the receiver. The pilot signals are sampled and decimated at the receiver to produce chip-rate digital spread spectrum signals. The digital spread spectrum signals contain information regarding the baseband carrier frequency, referred to simply as the carrier frequency. The carrier frequency can be decomposed into an expected carrier frequency and a carrier frequency offset. Mathematically, the digital spread spectrum signals can be represented as $$x(k)=p(k)e^{jk(\omega_0+\delta\omega_0)}$$

where p(k) denotes the PN code sequence, $\omega_0$ is the expected carrier frequency, and $\delta\omega_0$ represents the unknown carrier frequency offset to be estimated. The present invention provides an improved system and method for estimating and compensating the undesirable carrier offset based on a finite number of data samples: x(k), k=1,..., K. Thus the present invention determines and compensates for the carrier frequency.

In accordance with the present invention, the digital spread spectrum signals are first stripped of the PN sequence and compensated with the expected carrier frequency provided by a local digital oscillator. The resulting demodulated received signals, $y(k)=e^{jk(\delta\omega_0)}$, k=1,..., K, are then applied to a carrier offset estimator to determine the unknown carrier offset. The system and method of the present invention computes a result containing phase change information for pairs of the values y(k), k=1,..., K, and averages these results, to obtain a precise estimate of the carrier offset. As mentioned above, the carrier frequency offset estimation receives demodulated received signals referred to as $y(k)=e^{jk(\delta\omega_0)}$, k=1,..., K.

The estimator first computes a result containing phase change information for pairs of the demodulated received signals y(k). Each of the pairs comprises two values of y(k) having different values of k. In other words, each of the pairs comprises two elements, wherein each element of a pair is value of y(k) having a respective value of k. Computing a result containing phase change information preferably comprises dividing elements of pairs of the demodulated received signals, i.e., dividing different values of y(k), to compute a result containing phase change information for each of the pairs. Alternatively, The computing comprises multiplying a first element of a pair with the conjugate of the other element of the pair. The result containing phase change information is computed for at least a subset of the total possible pairs of the demodulated received signals.

In one embodiment, the computing comprises computing a result containing phase change information for at least a subset of the neighboring pairs of y(k). In another embodiment, the system computes a result containing phase change information for pairs of the demodulated received signals y(k), wherein elements of the pairs have one or more predetermined L-chip or L-sample intervals between the elements of the pairs. After the results are computed, the system calculates the average of at least a subset of the results. The system then normalizes the average, if necessary, to compute the carrier offset estimate. The normalization is performed using the one or more L-chip or L-sample intervals used in the computing.

After the carrier frequency offset estimation is performed, the system then adjusts the expected carrier frequency based on the carrier offset estimate. The adjusted expected carrier frequency is used for subsequent received digital spread spectrum signals to demodulate the subsequent received digital spread spectrum signals to remove the carrier frequency.

Before the expected carrier frequency is adjusted based on the carrier offset estimate, the system preferably performs validity testing to examine the validity of the carrier offset estimate. Thus the adjustment is only made using valid carrier offset estimates. The validity test may involve examining variations of the current carrier offset estimate with respect to a plurality of prior carrier offset estimates and determining if the variations are greater than a pre-determined threshold. Alternatively, the validity test may involve determining a carrier offset estimate using the Fourier Transform of the demodulated received signals to produce a reference carrier offset estimate, comparing the carrier offset estimate to the reference carrier offset estimate, and determining if the carrier offset estimate is within a pre-determined range of the reference carrier offset estimate. Finally, the validity test may involve examining the signal-to-noise ratio (SNR) of the demodulated received signals and determining if the SNR is below a pre-determined threshold.

According to the present invention, substantially exact carrier frequency offset estimation can be achieved in the absence of noise. The present invention provides an efficient estimate of the carrier offset without a large amount of computations. The present invention also has improved reliability and reduced storage requirements over prior art systems. The features, objects, and advantages of the present invention will become more apparent from the detailed description set forth below when taken in conjunction with the drawings.

BRIEF DESCRIPTION OF THE DRAWINGS

The accompanying drawings, which are incorporated in and constitute a part of this specification, illustrate particular embodiments of the invention, and together with the description, serve to explain the principles of the invention.

DETAILED DESCRIPTION OF THE PREFERRED EMBODIMENT

Incorporation by Reference

The following U.S. Patents are hereby incorporated by reference as though fully and completely set forth herein.

U.S. Pat. No. 4,336,616 to Carson et al. June/1982

U.S. Pat. No. 4,630,283 to Schiff December/1986

U.S. Pat. No. 4,841,544 to Nyutkens January/1989

U.S. Pat. No. 5,291,517 to Stein et al. May/1994

U.S. Pat. No. 5,303,257 to Stein et al. April/1994

U.S. Pat. No. 5,329,546 to Lee July/1994

U.S. Pat. No. 5,359,624 to Lee et al October/1994

Figure 1:
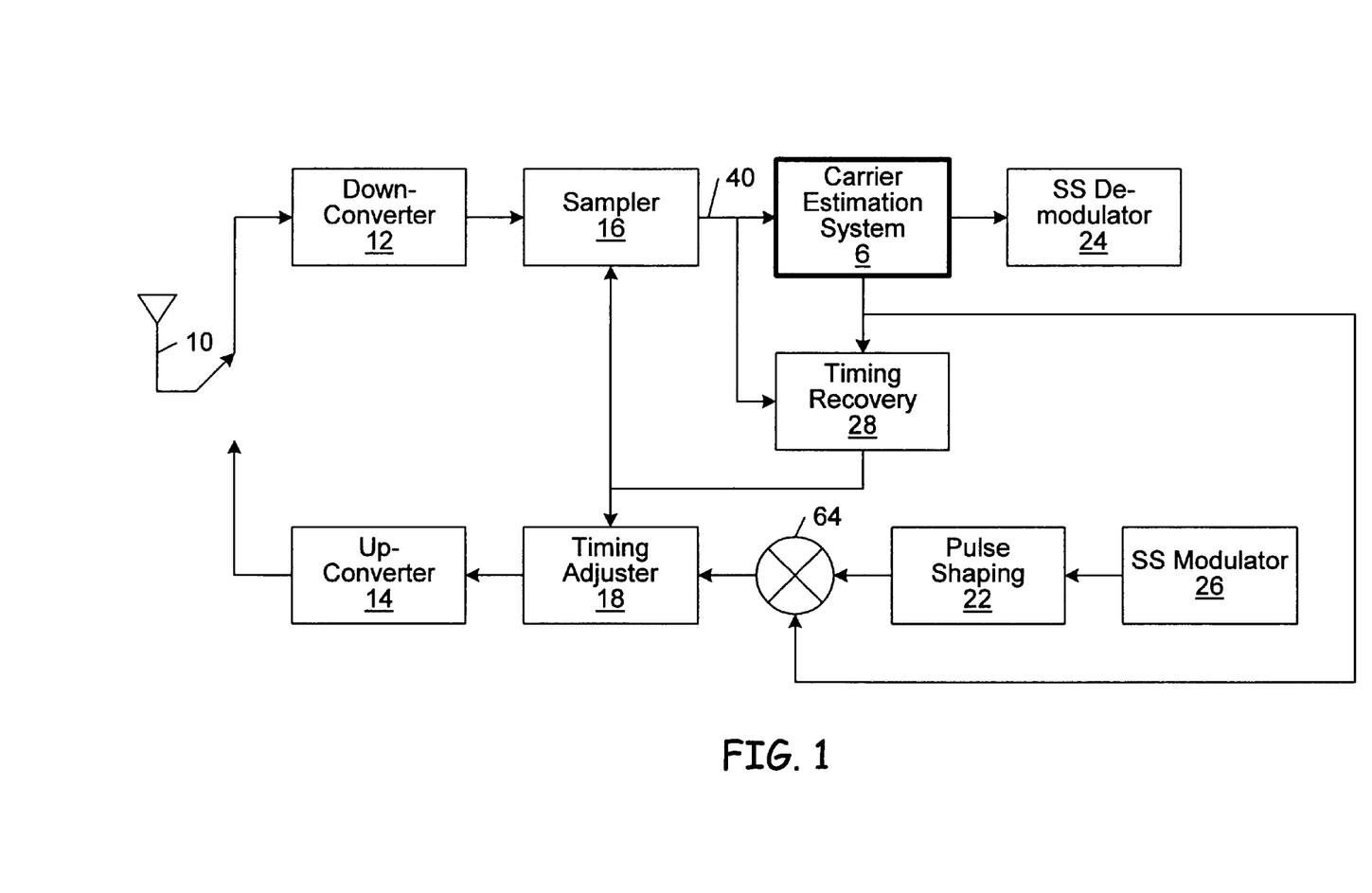
FIG. 1 illustrates a functional diagram of a typical spread spectrum communication system.

FIG. 1 illustrates a functional diagram of a spread spectrum communication system including a carrier estimation system 6 according to the present invention. In the preferred embodiment, the carrier estimation system 6 is comprised in a spread spectrum communication system. However, it is noted that the carrier estimation system 6 of the present invention may be incorporated into any of various systems, including both spread spectrum (SS) and non-spread spectrum systems, which either modulate information on an analog carrier wave or otherwise are required to analyze a baseband signal which includes an unknown carrier frequency that must be compensated. For more information on the system of the preferred embodiment, please see related co-pending application Ser. No. 08/768,100 filed Dec. 16, 1996, titled "Smart Antenna CDMA Wireless Communications System", whose inventors are Hui Liu and Guanxghan Xu, and which is hereby incorporated by reference in its entirety as though fully and completely set forth herein.

The system of FIG. 1 is preferably implemented using one or more programmable digital signal processors (DSPs) and one or more memories. However, the system may be implemented in various manners, including one or more programmable CPUs, microcontrollers or other programmable logic, discrete logic, etc.

In the embodiment shown, time-division-duplexing (TDD) is adopted for transmitted and received data, meaning that transmission (TX) and reception (RX) are performed in separate time frames. However, it is noted that any of various transmission and reception schemes may be used.

As shown, the spread spectrum communication system includes an antenna 10 which is adapted for transmitting and receiving signals modulated with an analog carrier frequency, preferably RF (radio frequency) modulated signals. The antenna 10 is coupled to a down-converter 12. The down-converter 12 down-converts the received signal from radio frequency (RF) to baseband. In other words, the down-converter 12 operates to demodulate the information from the analog carrier wave, i.e., to remove the analog carrier frequency.

The down-converter 12 is coupled to provide its output to a sampler 16. The sampler 16 receives the baseband signal and performs analog to digital conversion to produce digital spread spectrum signals 40. The sampler 16 preferably oversamples the signal and then decimates the samples to produce chip rate signals. The sampler 16 provides the digital spread spectrum signals or chip rate signals 40 to the carrier estimation system 6 according to the present invention. The sampler 16 receives an output from a timing recovery module 28, as shown. The information from the timing recovery module is used during the decimation process to correctly produce the chip rate signals.

The carrier estimation system 6 operates to estimate the carrier frequency still contained in the down-converted received signals 40, also referred to as the baseband signals 40. As mentioned above, the down-converter 12 operates to remove the analog carrier frequency from the received signals. However, due to the frequency difference between the two oscillators in the transmitter and the receiver, and possible inaccuracies in the transmitter modulator, the down-converted received signals or baseband signals 40 still include an unknown baseband carrier frequency, referred to herein as the carrier frequency.

As used herein, the term "analog carrier frequency" is used to refer to the carrier frequency, such as an RF carrier frequency, used by an up-converter to modulate data for transmission over a medium. The term "baseband carrier frequency" or simply "carrier frequency" is used to refer to the carrier frequency remaining in the baseband signal after down-conversion has been performed. The carrier frequency comprised in the baseband signal is a result of the frequency difference in the oscillators in the receiver and transmitter. The carrier frequency comprised in the baseband signal is time-varying, and can generally be considered as varying about a fixed point or "guess", referred to as the expected carrier frequency. The carrier frequency in the received baseband signal can thus be considered as comprising an expected carrier frequency plus an unknown carrier offset. The carrier frequency offset thus must be estimated, and the total carrier frequency comprising the expected carrier frequency and the carrier frequency offset must be compensated for improved results.

The carrier estimation system 6 provides the received signals, with the expected carrier frequency and the carrier frequency offset removed, to a spread spectrum (SS) demodulator 24 for demodulation. The SS demodulator 24 operates to recover the transmitted message data from the remote terminal as is done in the current art. The carrier estimation system 6 also provides an output comprising the total estimated carrier frequency to a timing recovery module 28 and a mixer 64 in the transmission path.

The timing recovery module 28 receives an output from the carrier estimation system 6 and also receives the signals 40 output from the sampler 16. The timing recovery module 28 operates to determine a timing signal based on the carrier offset frequency. The timing recovery module 28 provides this timing signal to the sampler 16 and to a timing adjuster 18 in the transmission path. The timing signal is used by the sampler 16 to aid in the decimation process to produce the chip rate signals 40, as described above. The timing signal is also used by the timing adjuster 18 in the transmission path for similar purposes.

The transmission path comprises an SS modulator 26 which modulates message data with a pseudo noise signal or spread spectrum signal. The SS modulator 26 modulates message data intended for remote terminals as is done in current art. A pulse shaping module 22 is coupled to the output of the SS modulator 26 and operates to limit signal energy to a predetermined bandwidth. The pulse shaped signals are then provided to a mixer 64. The mixer 64 operates to mix the pulse shaped signals with a carrier frequency. As described above, the mixer 64 receives the carrier frequency from the carrier estimation system 6, wherein the carrier frequency comprises the expected carrier frequency and the estimated carrier frequency offset. The mixer 64 modulates the signals with the carrier frequency determined by the carrier offset estimator 38 to pre-compensate the transmitted signal with the difference in oscillator frequencies.

The mixer 64 provides its output to a timing adjuster 18. As mentioned above, the timing adjuster 18 also receives a timing signal from the timing recovery module 28. The timing adjuster 18 adjusts the transmit timing based on the information provided by the timing recovery module 28. The resulting baseband signal is then applied to an up-converter (14). The up-converter 14 modulates the baseband signal with the analog carrier frequency, and the resulting signals are provided to the antenna 10 for transmission.

Therefore, the mixer 64 operates to modulate the message information, in this embodiment the spread spectrum modulated signals, with both the expected carrier frequency and the carrier frequency offset. The up-converter 14 further operates to modulate the baseband message information with an analog carrier frequency for transmission.

Therefore, during a first time frame, i.e., the reception frame, the antenna 10 receives a signal and the down-converter 12 down-converts the received signal from radio frequency (RF) to baseband. The sampler 16 digitizes the baseband signals to produce digital spread spectrum signals 40. As mentioned above, even after down-conversion, the baseband signals are still modulated by an expected carrier frequency, which is known, and a carrier frequency offset, which is unknown. The carrier estimation system 6 estimates the carrier frequency offset and provides the expected carrier frequency source for both the timing recovery module 28 and the mixer 64 in the transmission path.

During a second time frame, i.e., the transmission frame, message data intended for remote terminals are modulated by the SS modulator 26, and pulse shaping is then performed. The pulse shaped signals are fed to the mixer 64 to mix with the carrier frequency provided by the carrier estimation system 6. The resulting signals are then provided through the timing adjuster 18, and the baseband signal is then provided to the up-converter 14. The up-converter 14 modulates the baseband signal on an analog carrier frequency, and the resulting signal is provided to the antenna 10 for transmission.

In spread spectrum communications, a communication from each user initially begins with a training period followed by actual voice or message data. During the training period, pilot signals modulated by the respective user's PN sequence are transmitted to provide a carrier reference for the receiver. The pilot signals are sampled and decimated at the receiver to produce chip-rate digital spread spectrum signals. The digital spread spectrum signals contain information regarding the carrier frequency. The carrier frequency can be decomposed into an expected carrier frequency and a carrier frequency offset. Mathematically, the digital spread spectrum signals can be represented as $$x9k)=p(k)e^{jk(\omega_0+\delta\omega_0)}$$

where p(k) denotes the PN code sequence, $\omega_0$ is the expected carrier frequency, and $\delta\omega_0$ represents the unknown carrier frequency offset to be estimated. The objective herein is to estimate and compensate the undesirable carrier offset based on a finite number of data samples: x(k), k=1, . . . , K.

Figure 2:
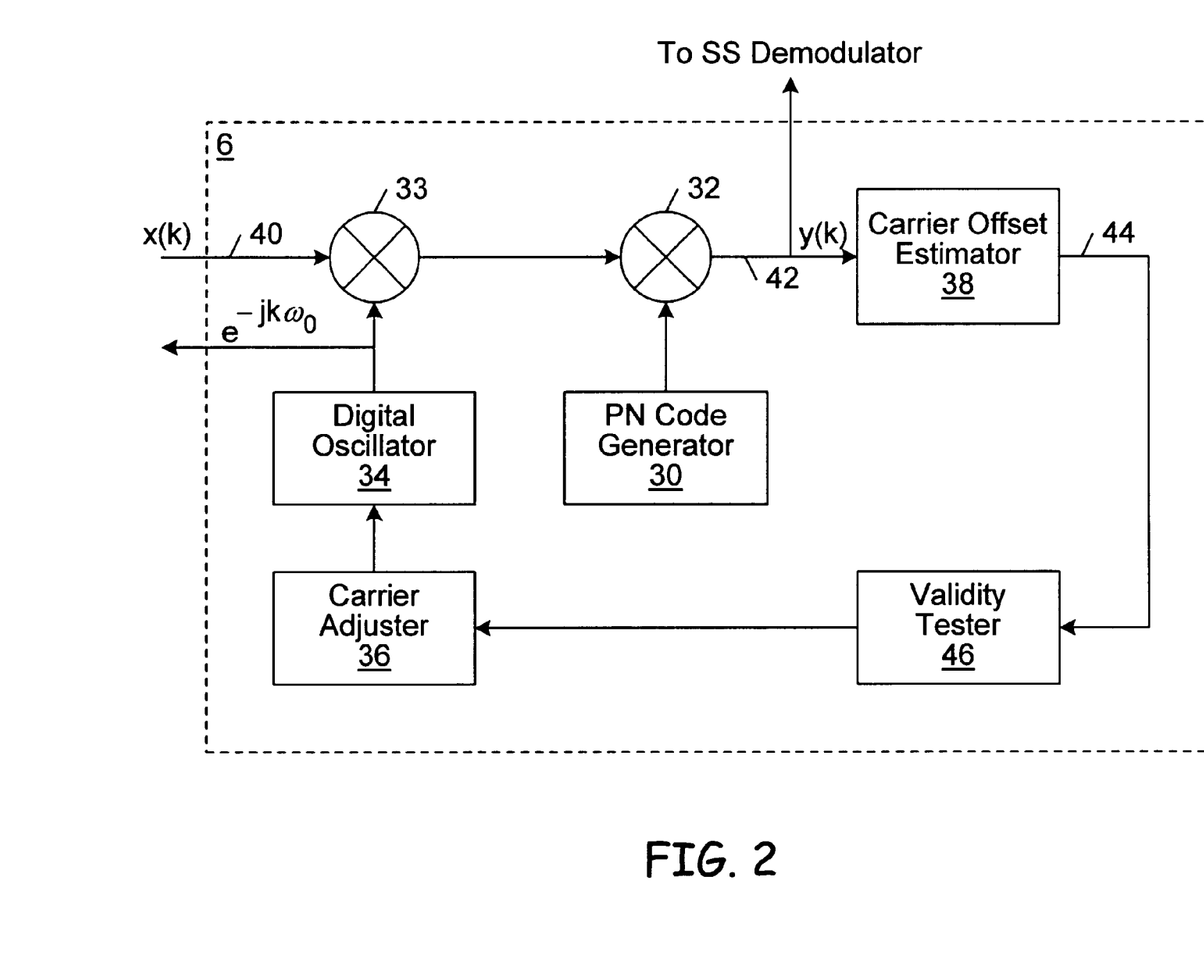
FIG. 2 is a block diagram of an embodiment of a carrier offset estimation system in accordance with the present invention.

Briefly, in accordance with the present invention, the digital spread spectrum signals are first stripped of the PN sequence and compensated with the expected carrier frequency provided by a local digital oscillator 34 (FIG. 2). The resulting demodulated received signals, $y(k)=e^{jk(\delta\omega_0)}$, k=1, . . . , K, are then applied to a carrier offset estimator 38 (FIG. 2) to determine the unknown carrier offset. Prior art methods generally estimate $\delta\omega_0$ by mixing y(k) with pre-stored samples of a plurality of closely spaced sinusoidal tones. In contrast to these prior art methods, the disclosed approach calculates phase change information of y(k), k=1, . . . , K, to obtain a precise estimate of the carrier offset. The calculation of phase change information preferably involves dividing elements of the demodulated received signals with each other to compute a result containing phase change information for each of the at least a subset of pairs. The method then calculates the average of at least a subset of the results to compute the carrier offset estimate, and then normalizes as necessary.

The system and method of the present invention provides substantially exact carrier frequency offset estimation in the absence of noise. Robustness is provided by a validity tester which excludes invalid estimates. Only valid estimates are passed along to an adjuster which updates the expected carrier frequency for demodulation of subsequent received digital signals.

FIG. 2—Carrier Estimation System

FIG. 2 shows a block diagram of one embodiment of the carrier estimation system 6 in accordance with the present invention. As noted above, the carrier estimation system 6 may be implemented in any of various ways, including one or more DSPs and associated one or more memories, programmable CPUs microcontrollers or other programmable logic, discrete logic, analog circuitry, or combinations thereof.

Techniques well-known in the art can be used to down-convert the received signals to baseband and perform sampling and synchronization to generate samples of the received signal. Inputs to the present system, x(k), are digital signals. As noted above, the analog carrier frequency has already been removed from the digital signals x(k). The digital signals x(k) include a carrier frequency which can be considered as comprising an expected carrier frequency and a carrier frequency offset. In the preferred spread spectrum embodiment, the inputs x(k) are digital spread spectrum signals. As noted above, the inputs x(k) may comprise other types of digital signals, e.g., non-spread spectrum signals.

As shown, the carrier estimation system 6 comprises an oscillator 34 coupled to a multiplier or mixer 33. The inputs x(k) are provided to an input of the multiplier 33. The multiplier 33 operates to mix the digital spread spectrum signals with the expected carrier frequency provided by the digital oscillator 34. The multiplier 33 thus operates to remove the expected carrier frequency from the inputs x(k).

It is noted that the preferred embodiment of the invention operates to remove the expected carrier frequency and then determine the remaining offset. In another embodiment, the system does not remove an expected carrier frequency, but rather determines the entire unknown carrier frequency.

The output of the multiplier 33 is provided to a second mixer 32. A PN code generator 30 is coupled to provide a replica of the PN sequence to the multiplier 32. The multiplier 32 multiplies the received signals with the replica of the PN sequence to further remove the PN code sequence. Thus the multipliers 33 and 32 operate to remove the expected carrier frequency and the PN code sequence from the inputs x(k). It is noted that the multiplier 32 and the PN code generator 30 are included in the spread spectrum preferred embodiment, but may be omitted in non-spread spectrum embodiments.

The resulting demodulated received signals y(k) 42 are applied to a carrier offset estimator 38 for estimating the carrier frequency offset during the training period. After the training period, the demodulated received signals are passed along to the SS demodulator 24 to recover the transmitted message data.

According to the present invention, the carrier offset estimator 38 provides an accurate carrier offset estimate 44 from the demodulated received signal, y(k). Detailed discussion regarding the frequency estimation mechanism is provided below. In the preferred embodiment the carrier offset estimator 38 is coupled to a validity tester 46 which examines the validity of the estimate. Upon completion of the carrier offset estimation by the carrier offset estimator 38, the estimated carrier offset is provided to the validity tester 46. It is noted that validity testing is preferably performed, but may be omitted, as desired.

A variety of approaches can be employed to examine whether or not the estimate is qualified to update the expect carrier frequency. Here the term $\delta\hat{\omega}_0(n)$ is used to denote the carrier offset estimate obtained during the nth reception frame. In one embodiment, the current carrier offset estimate is compared with its previous values. Since only graceful carrier variations are possible in practice, any estimate with a relative change, i.e., $|\delta\hat{\omega}_0(n)-\delta\hat{\omega}_0(n-k)|$, k=1, ..., , over a predetermined threshold is excluded.

In another embodiment, the sequence of carrier offset estimates is passed through a low pass FIR filter to smooth out estimates with high variations. In another embodiment, a frequency domain transform, preferably an FFT, is applied to the demodulated received signals to obtain a reference carrier offset estimate, and the carrier offset estimate is determined to be invalid if the carrier offset estimate is not within a pre-determined range of the reference carrier offset estimate. Yet in another embodiment, the signal-to-noise ratio (SNR) of the demodulated received signals is first examined. The carrier offset estimate is determined to be invalid if the SNR is below a pre-determined threshold. Any of various methods may be used for validity testing, as desired.

The validity tester 46 is coupled to a carrier adjuster 36. Once a valid carrier offset estimate, denoted hereafter as $\delta\hat{\omega}$, is identified, the carrier adjuster 46 updates the expected carrier frequency. In one embodiment, the carrier adjuster 36 simply modifies the new expected carrier frequency as $\omega_0(n)=\omega_0(n-1)+\delta\hat{\omega}_0(n)$. In another embodiment, the carrier adjuster 36 accounts for additional information, i.e., the confidence level of the carrier offset estimate, and updates the expected carrier frequency more gracefully. More sophisticated techniques well-known in the art can be employed to realize the same function.

Figure 3:
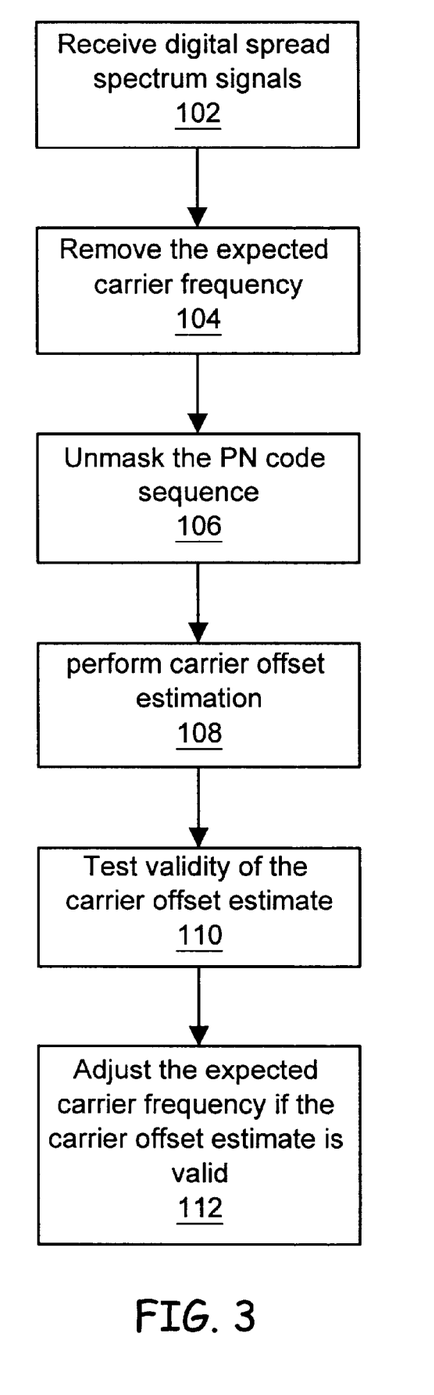
FIG. 3 is a flowchart diagram illustrating one embodiment of carrier recovery and compensation operations in accordance with the present invention.

FIG. 3—Carrier Estimation System Method

FIG. 3 is a flowchart diagram illustrating the disclosed carrier offset estimation operations, i.e., operation of the carrier estimation system 6, in accordance with the present invention.

As shown, in step 102 the system receive digital signals. In the preferred spread spectrum embodiment, the received digital signals comprise digital spread spectrum signals. The digital spread spectrum signals are generated using analog circuits and samplers as is done in the current art. In step 104 the system removes the expected carrier frequency from the received signals. Thus, in order to recover the unknown carrier offset in the digital signals, the expected carrier frequency is first demodulated or removed. In step 106 the system unmasks the PN code sequence from the spread spectrum digital signals. It is noted that step 106 is performed only in the preferred spread spectrum embodiment. Thus, in order to recover the unknown carrier offset in received digital spread spectrum signals, the PN sequence and the expected carrier frequency are both first demodulated or removed.

After operation of steps 102–106, the resulting demodulated received signals are referred to as $y(k)=e^{jk(\delta\omega_0)}$, k=1, ..., K. These values are then applied to the carrier offset estimator 38 to determine the unknown carrier offset. If there were no carrier offset, then the signals y(k) would comprise a DC value. However, due to the carrier offset, the signals y(k) essentially comprise a sinusoid.

In step 108 the system performs carrier offset estimation. As discussed further below, in the preferred embodiment a plurality of pairs of the resulting demodulated received signals are divided to produce a set of results containing phase change information. The results are then averaged, and normalization is optionally performed, to produce the carrier offset estimate. In step 110 validity testing is preferably performed to evaluate the "goodness" or accuracy of the estimate. The various different types of validity testing were discussed above. In step 112 the system adjusts the carrier frequency if the carrier frequency offset estimate is deemed valid. Thus, only valid carrier offset estimates are preferably used in adjusting the expected carrier frequency for demodulating subsequent signals.

Figure 4:
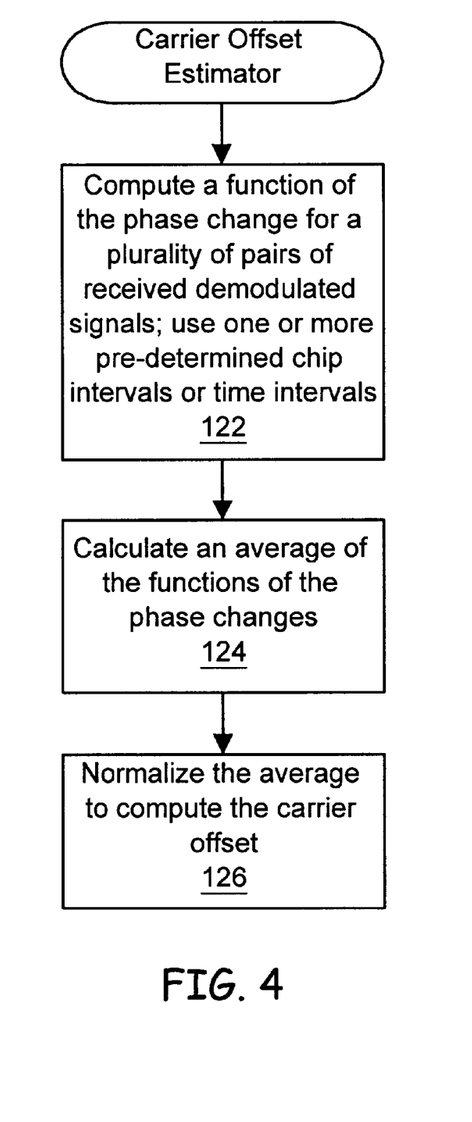
FIG. 4 is a flowchart diagram illustrating operation of the carrier offset estimator of FIG. 2.

FIG. 4—Carrier Offset Estimator

Referring now to FIG. 4, a flowchart diagram illustrating the carrier offset estimation performed in step 108 of FIG. 3 is shown. FIG. 4 illustrates the operation of the carrier offset estimator 38 of FIG. 2. As mentioned above, the carrier frequency offset estimation receives demodulated received signals referred to as $y(k)=e^{jk(\delta\omega_0)}$, $k=1, \ldots, K$.

As shown, in step 122 the estimator 38 computes a function of the phase change for a plurality of pairs of the received demodulated signals. In the preferred embodiment, the estimator 38 divides pairs of the demodulated received signals $y(k)$ to compute a result containing phase change information for each of the pairs. Each of the pairs comprises two values of $y(k)$ having different values of k. Each of the pairs can be stated to comprise two elements, wherein each element of a pair is value of $y(k)$ having a respective value of k. The dividing comprises dividing elements of pairs of the demodulated received signals, i.e., dividing different values of $y(k)$, to compute a result containing the phase change information for each of the pairs. The dividing preferably comprises dividing elements of pairs of the demodulated received signals for at least a subset of the total possible number of pairs. It is noted that the dividing operation can be realized by multiplying a first element with the conjugate of the second element.

In one embodiment, the dividing comprises dividing at least a subset of the neighboring pairs of $y(k)$, i.e., pairs comprising neighboring values of $y(k)$, such as $\{y(1), y(2)\}$, $\{y(2), y(3)\}$, $\{y(3), y(4)\}$, etc.

In another embodiment, dividing comprises dividing at least a subset of pairs of the demodulated received signals $y(k)$, wherein elements of the pairs have a predetermined L-chip interval between the elements of the pairs. An example of this embodiment is a sequence of pairs such as $\{y(1), y(4)\}$, $\{y(2), y(5)\}$, $\{y(3), y(6)\}$, etc.

In another embodiment, dividing comprises dividing at least a subset of pairs of the demodulated received signals $y(k)$, wherein elements of the pairs have two or more differing predetermined L-chip intervals between the elements of the pairs. An example of this embodiment is a sequence of pairs such as $\{y(1), y(2)\}$, $\{y(2), y(3)\}$, $\{y(3), y(6)\}$, $\{y(4), y(7)\}$, etc. In this embodiment, normalization is required for each group of pairs that uses a different predetermined L-chip interval.

After dividing is performed in step 122, in step 124 the system calculates the average of at least a subset of the results containing phase change information to compute the carrier offset estimate. In the preferred embodiment, all of the computed results are used. In another embodiment, a subset of these results is used, e.g., one or more of the low and high results are thrown out, and the remaining results are used in the averaging process.

After averaging is performed in step 124, in step 126 the system normalizes the average, if necessary, to compute the carrier offset. The normalization is performed using the one or more L-chip intervals used in the dividing. In an embodiment where the dividing is performed solely using neighboring pairs of $y(k)$ values, the L-chip interval is 1, and no normalization is necessary. In an embodiment where the dividing is performed using pairs have a single predetermined L-chip interval between the respective elements of the pairs of $y(k)$ values, the normalizing is performed using a factor of L to compensate for the L-chip interval.

As mentioned above, where the dividing includes dividing the at least a subset of pairs of $y(k)$ with one or more predetermined chip intervals, the normalizing is performed for each respective group using respective ones of the one or more predetermined chip intervals, and this normalization is performed prior to averaging. Alternatively, the system can first calculate one or more averages for each of the respective groups which uses a different predetermined chip interval. This is followed by normalizing each of the one or more averages by respective ones of the one or more predetermined chip intervals. This normalizing produces one or more normalized averages. The system then averages the one or more normalized averages to compute the carrier offset estimate.

In a non-spread spectrum embodiment, the dividing comprises dividing at least a subset of pairs of the demodulated received signals $y(k)$, wherein elements of the pairs have one or more differing predetermined time intervals between the elements of the pairs. Similar embodiments to those described above may also be used, where differing one or more time intervals are used instead of differing one or more L-chip intervals.

In the preferred embodiment, in the initial iteration of the flowchart of FIG. 4, the expected carrier frequency is initially set to 0, and the first carrier frequency offset estimate is the entire determined baseband carrier frequency. On the next iteration, this initial carrier frequency offset estimate is then used as the expected carrier frequency, and a new offset is determined based on this expected carrier frequency. On subsequent iterations, the combined expected carrier frequency and carrier frequency offset estimate determined in a respective calculations are used as the next expected carrier frequency in the subsequent calculation. The flowchart thus proceeds adaptively in this manner, i.e., the expected carrier frequency is adjusted based on the new offset estimate for frequency compensation in subsequent reception and transmission operations.

Figure 5:
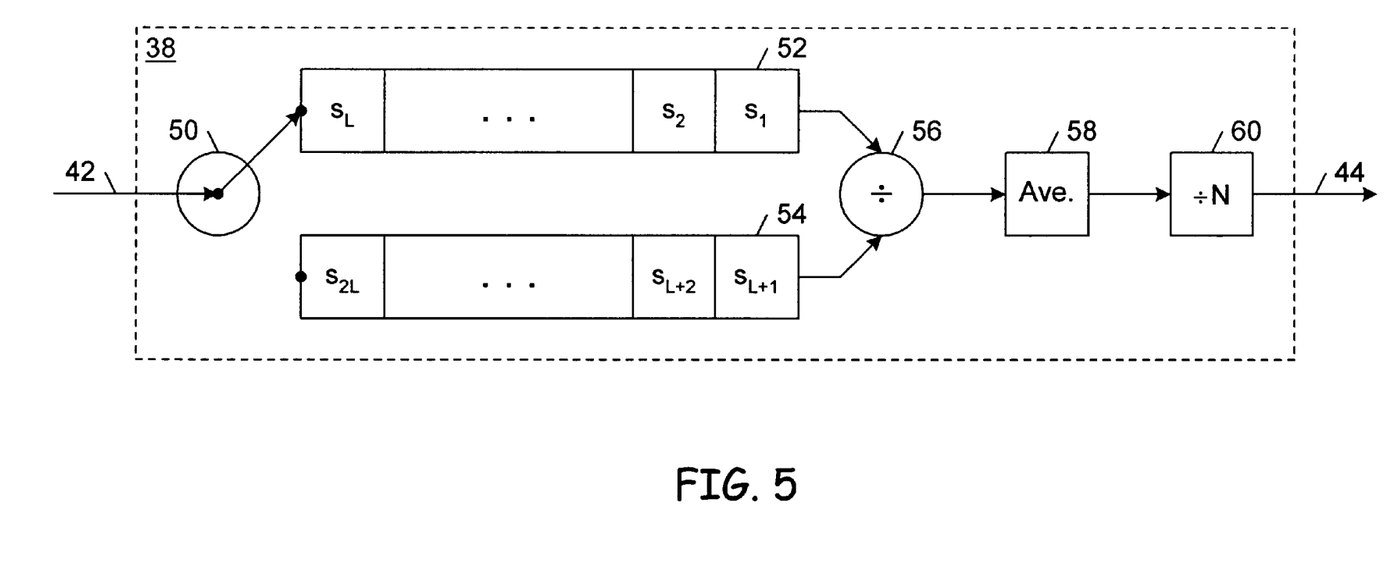
FIG. 5 is a block diagram of an embodiment of a carrier offset estimator in accordance with the present invention.

FIG. 5—Carrier Offset Estimator Embodiment

FIG. 5 illustrates an exemplary embodiment of the carrier offset estimator 38 in accordance of the present invention. Demodulated signals (22), $y(k)$, are piped to a switch 50 and distributed to a first register 52 and a second register 54 for storing respective elements of pairs of the demodulated received signals with time interval L. Thus one register 52 stores a value $y(k1)$, and the second register 54 stores a value $y(k2)$ A divider 56 is coupled to the first and second registers 52 and 54 for dividing an element of a pair stored in the first register by an element of the pair stored in the second register to produce a result containing the phase change information. An averager 58 is coupled to the divider 56 for calculating an average of results to compute the carrier offset estimate. Finally, a normalizer 60 is coupled to the averager 58 for normalizing the average to compute the carrier offset estimate.

As noted above, the carrier offset estimator 38 may be implemented in any of various manners, including one or more DSPs and associated one or more memories, programmable CPUs microcontrollers or other programmable logic, discrete logic, analog circuitry, or combinations thereof.

It is noted that only registers of length L are required to buffer samples with time separation of L chips. The averager 58 can be implemented adaptively and thus requires no storage. The capability of obtaining a high-resolution carrier offset estimate with minimum storage and computations is unique to the present invention.

In an ideal scenario, the demodulated received signal is simply a pure tone which implies that any pair of samples contains sufficient information of the carrier offset. In practice however, noise and other peturbation is inevitable. Thus a plurality of pairs of samples are used, with possible differing L-chip or time intervals. The use of a plurality of pairs of samples, followed by averaging and normalization, tend to cancel out the noise and peturbations.

The following summarizes the preferred embodiment of the estimation procedure,

Divide (or multiply a conjugate of one element with another element) a plurality of pairs of samples with a predetermined time interval, L, to obtain a set of results containing phase change information:

$$z(k) = \frac{y(k+L)}{y(k)} = e^{jL\delta\omega_0} + n(k), k = 1, \ldots, N-L, \text{ or,}$$

$$z(k) = y(k+L) \times y^*(k) = e^{jL\delta\omega_0} + n(k), k = 1, \ldots, N-L,$$

where n(k) denotes the peturbation term;

Calculate the average of the resulting set of estimates:

$$\bar{z} = \frac{1}{N-L} \sum_{k=1}^{N-L} z(k);$$

Estimate the carrier offset as the normalized (by a factor of L) phase of the average.

As noted above, in one embodiment, L is simply chosen to be 1, i.e., only neighboring elements are used in computation. The carrier offset estimate can thus be accomplished without normalization. In another embodiment, pairs of demodulated received signals with one or more predetermined chip intervals or time intervals are first divided to produce a set of results containing the phase change information; each of the results are then normalized with respect to its corresponding interval to produce a set of normalized results; and finally, the normalized results are averaged to produce a carrier offset estimate. In yet another embodiment, pairs of the demodulated received signals with one or more predetermined chip intervals are divided to compute a set of results containing the phase change information; each subset of results with the same interval are averaged; and all averages are then normalized with respect to their respective intervals to produced a set of normalized results; and the set of normalized results are then averaged to produce a carrier offset estimate.

Evidently, the computations required to accomplish the above estimation is fixed in each embodiment, yet the resolution of carrier offset estimate has no limit. The present invention addresses both accuracy and cost issues and clearly has significant advantages over prior approaches. In the preferred embodiment, L is selected to be greater than 1. The reason to select L other than 1 in the preferred embodiment is two-fold: First of all, by increasing the phase difference from $\delta\omega_0$ to $L\delta\omega_0$, the phase of $\bar{z}$ can be more easily detected, thereby allowing more accurate estimation of the true carrier offset, $\delta\omega_0$; More importantly, the expansion in phase provides additional resistance to perturbation, and hence leads to more reliable estimation.

Some of the advantages of the present invention may be summarized as follows:

The disclosed method provides an efficient estimate of the carrier offset by exploiting the structure information of the demodulated received signals. Contrasting to prior art where high resolution can only be achieved at the cost of computations, the present method has fixed computational expense without resolution or estimation range limitations.

Reliability is guaranteed by means of validity testing. The expected carrier frequency is adjusted adaptively using only valid carrier offset estimates, thereby eliminating the possibility of catastrophic errors.

No storage requirements: In the prior art, sufficient time and memory must be allocated to construct and store samples of closely spaced sinusoidal tones; this may become exceedingly different as the resolution requirement increases. The estimation scheme in the present invention has minimum requirements in both memory and computational time.

It will be apparent to those skilled in the art that various modifications can be made to the carrier recovery and compensation system and method of the instant invention without departing from the scope or spirit of the invention, and it is intended that the present invention cover modifications and variations of the carrier recovery and compensation system and method provided they come in the scope of the appended claims and their equivalents.

We claim:

1. In a direct sequence spread spectrum communication system, wherein digital spread spectrum signals modulated by a pseudo-random sequence have a carrier frequency, wherein the carrier frequency includes an expected carrier frequency and a carrier frequency offset, a carrier offset estimation method for recovering the carrier offset, comprising the steps of:

receiving digital spread spectrum signals modulated with a pseudo-random sequence, wherein said digital spread spectrum signals have a carrier frequency, wherein the carrier frequency includes an expected carrier frequency and a carrier frequency offset;

demodulating said digital spread spectrum signals to remove said expected carrier frequency, wherein said demodulating also includes demodulating said digital spread spectrum signals to remove said pseudo-random sequence, wherein said demodulating produces demodulated received signals;

computing a result containing phase change information for each of a plurality of pairs of said demodulated received signals wherein elements of said plurality of pairs have a predetermined L-chip interval;

calculating the average of said results to compute the carrier offset estimate; and normalizing said average by a factor of L to compute the carrier offset estimate, wherein said normalizing is performed after said calculating said average.

2. The carrier offset estimation method of claim 1, further comprising:

adjusting said expected carrier frequency based on said carrier offset estimate, wherein said adjusted expected carrier frequency is used for subsequent received digital spread spectrum signals to demodulate said subsequent received digital spread spectrum signals to remove said carrier frequency.

3. The carrier offset estimation method of claim 2, further comprising:
examining the validity of said carrier offset estimate after computing said carrier offset estimate;
wherein said adjusting is performed using only valid carrier offset estimates.

4. The carrier offset estimation method of claim 3, wherein said examining the validity of said carrier offset estimate includes:
examining variations of the current carrier offset estimate with respect to a plurality of prior carrier offset estimates;
determining if said variations are greater than a pre-determined threshold, wherein said carrier offset estimate is determined to be invalid if said variations are greater than said pre-determined threshold.

5. The carrier offset estimation method of claim 3, wherein said examining the validity of said carrier offset estimate includes:
determining a carrier offset estimate using the Fourier Transform of said demodulated received signals to produce a reference carrier offset estimate;
comparing said carrier offset estimate to said reference carrier offset estimate;
determining if said carrier offset estimate is within a pre-determined range of said reference carrier offset estimate, wherein said carrier offset estimate is determined to be invalid if said carrier offset estimate is not within said pre-determined range of said reference carrier offset estimate.

6. The carrier offset estimation method of claim 3, wherein said examining the validity of said carrier offset estimate includes:
examining the signal-to-noise ratio (SNR) of said demodulated received signals, wherein said carrier offset estimate is determined to be invalid if said SNR is below a pre-determined threshold.

7. The carrier offset estimation method of claim 1,
wherein each of said pairs comprises two elements;
wherein said computing a result comprising phase change information comprises dividing elements of each of said plurality of pairs of said demodulated received signals to compute a result comprising phase change information for each of said plurality of pairs.

8. The carrier offset estimation method of claim 1,
wherein each of said pairs comprises first and second elements;
wherein said computing a result comprising phase change information for a pair of said demodulated received signals comprises multiplying a first element of the pair with a conjugate of the second element of the pair to compute the result comprising phase change information for the pair.

9. A carrier offset estimation system for recovering carrier offset in a direct sequence spread spectrum communication system, wherein the communication system receives digital spread spectrum signals modulated with a pseudo-random sequence, wherein the digital spread spectrum signals have a carrier frequency, wherein the carrier frequency includes an expected carrier frequency and a carrier frequency offset, the carrier offset estimation system comprising:
a demodulator for demodulating said digital spread spectrum signals to remove said expected carrier frequency, wherein said demodulator also demodulates said digital spread spectrum signals to remove said pseudo-random sequence, wherein said demodulator produces demodulated received signals;
a carrier offset estimator, comprising:
means for computing a result containing phase change information for each of a plurality of pairs of said demodulated received signals including first and second registers for storing respective elements of said pairs of said demodulated received signals and a divider coupled to said first and second registers for dividing an element of a pair stored in said first register by an element of said pair stored in said second register;
means for calculating the average of said results to compute the carrier offset estimate including an averager coupled to said divider for calculating an average of at least a subset of said results containing phase change information to compute the carrier offset estimate; and
a normalizer coupled to said averager for normalizing said average to compute the carrier offset estimate.

10. The carrier offset estimation system of claim 9, further comprising:
a carrier adjuster for adjusting said expected carrier frequency based on the carrier offset estimate, wherein said adjusted expected carrier frequency is used for subsequent received digital spread spectrum signals to demodulate said subsequent received digital spread spectrum signals to remove said carrier frequency.

11. The carrier offset estimation system of claim 10, further comprising:
a validity tester for examining the validity of said carrier offset estimate;
wherein said carrier adjuster uses only valid carrier offset estimates.

* * * * *